United States Patent [19]

Mölter et al.

[11] Patent Number: 4,764,057

[45] Date of Patent: Aug. 16, 1988

[54] DEVICE FOR PRODUCING A SOLID AEROSOL

[75] Inventors: Leander Mölter, Eggenstein-Leopoldshafen; Wolfgang Mölter; Friedrich Munzinger, both of Karlsruhe, all of Fed. Rep. of Germany

[73] Assignee: Palas GmbH Partikel-und Lasermesstechnik, Karlsruhe, Fed. Rep. of Germany

[21] Appl. No.: 868,437

[22] Filed: May 30, 1986

[30] Foreign Application Priority Data

May 30, 1985 [DE] Fed. Rep. of Germany ....... 8515780

[51] Int. Cl.[4] .............................................. B65G 53/48

[52] U.S. Cl. ...................................... 406/69; 239/325; 239/590; 406/195

[58] Field of Search ....................... 406/31, 70, 69, 76, 406/144, 195; 239/589, 590, 325; 222/406

[56] References Cited

U.S. PATENT DOCUMENTS 2,805,895 9/1957 Pynor ............................... 406/31 X
4,078,725 3/1978 Bauer ............................. 222/406 X

FOREIGN PATENT DOCUMENTS 2533554 2/1977 Fed. Rep. of Germany ........ 406/69

*Primary Examiner*—Galen Barefoot
*Assistant Examiner*—Paul E. Salmon
*Attorney, Agent, or Firm*—Antonelli, Terry & Wands

[57] ABSTRACT

An apparatus for producing a solid aerosol from a heap, with a solids container, a feed piston, a rotary brush, an air intake and an outlet passage. To improve the constancy of the particle output the outlet passage has a non-increasing cross-section over a length thereof, with an increasing depth. In addition, in the outlet path of the solid aerosol it is possible to provide a light detector, which is connected by a regulating device to a drive of the piston.

18 Claims, 4 Drawing Sheets

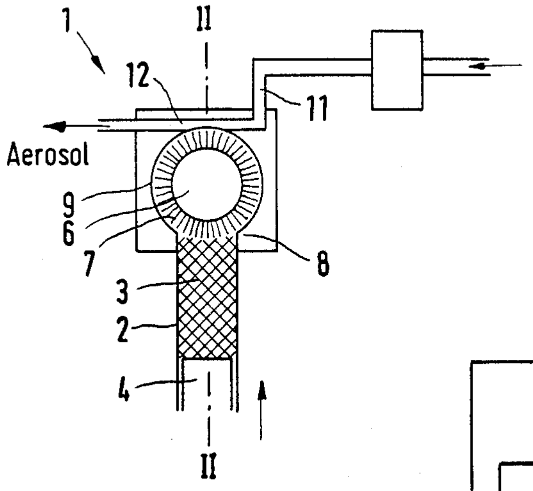
FIG. 1
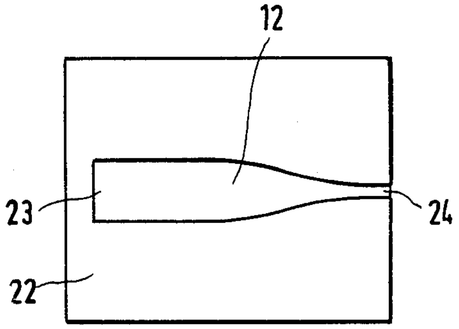
FIG. 4
FIG. 3c
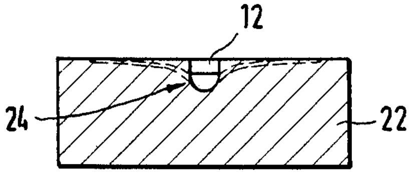
FIG. 3a
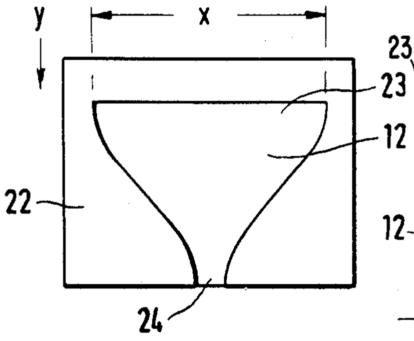
FIG. 3b
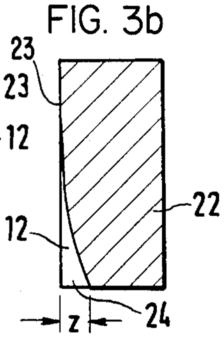

DEVICE FOR PRODUCING A SOLID AEROSOL

The present invention relates to an apparatus for producing a solid aerosol from a heap or bed, with a container for accommodating solids, a feed piston, a rotary brush, an air intake and an outlet passage.

An apparatus of the aforementioned type is disclosed in, for example, DE-OS 25 33 554 wherein fine-grain compressed solids are filled into a cylindrical container and are supplied with the aid of a piston to a rotary element in the form of a brush, which separates the solids into layers. The necessary air flow is then supplied via air intakes initially into the vicinity of the brush rotation axis and then to the brush circumference, in the area in which the solids are detached from the heap by the brush. An aerosol outlet connection is provided in this area through which air and solids are led to the outside. The known apparatus has a number of disadvantages. Thus, the cross-section of the outlet connection is fixed and is increased at least in certain parts of its length, so that incrustations can form in the discharge passage through the adhesion of already dispensed solid particles entrained by the air. Ultimately this can lead to output fluctuations as a result of periodic growth and detachment of the solid particles. Additionally, the proposed apparatus is not pressure-tight. If there is a counter-pressure in the outlet region, this leads to the air and solid particles in part beating back over the shaft bearing of the brush, leading to deposits there or the escape thereof, so that the measurement results can be falsified. Additionally, particularly the outlet region of the known apparatus, where deposits can occur, is difficult to clean.

The aim underlying the present invention essentially resides in avoiding the aforementioned disadvantages encountered in the prior art and to provide an apparatus of the aforementioned type which enables a reliable constant output and avoids a deposition of solid particles.

According to the present invention, an apparatus of the aforementioned type is provided wherein the outlet channel has a cross-section which does not increase over a length thereof, even with increasing depth. Due to an increasing cross-section, at least over partial zones, in the proposed apparatus, flow reductions occur and, consequently, the aforementioned deposits result; whereas, in accordance with construction of the present invention, it is possible to reliably avoid a flow reduction in the outlet passage.

In accordance with advantageous features of the present invention, the area of the cross-section of the outlet passage is reduced over a length thereof thereby resulting in a flow rate increase.

According to further advantageous features of the present invention, if the flow rate is to be constant over the entire outlet passage, the area of the cross-section of the outlet passage remains constant over an entire length thereof. It is important that the cross-sectional shape is not the same over the entire length of the outlet passage but rather changes from a relatively flat region where the solids are received to an outlet port of the passage where the depth and width substantially coincide. It has been found that the depth and width of the outlet passage cannot generally change linearly over a length thereof because then the cross-sectional surface does not generally remain constant over the length and instead there is a maximum in the central region, that is, an increase in a partial zone, which would lead to speed reductions which must be avoided so as to avoid the occurrence of deposits.

The present invention avoids the problem of deposition of solids by virtue of the fact that the boundary walls of the outlet passage do not have edges and the walls defining transitions between the depth and width of the outlet channel are at least rounded. In particular, the cross-section in the outlet region is such that the lower half of the outlet port forms a semicircle having a radius which is half a height of the outlet port.

From the manufacturing and practical standpoint, it has been proven to be advantageous for the outlet passage to be spaced from the opening of the solid container to the brush zone and the outlet passage more particularly diametrically faces the opening of the the container to the brush zone. In such cases, it is possible to provide for the outlet passage to be constructed in a removable part separate from the brush casing. Thus, the outlet passages can be easily removed and cleaned by replacing the removable part, which is constructed in the form of a cover.

They can also be easily replaced, making it possible to use outlet passages adapted to the particular problem, e.g. to different internal diameters of solids containers, so that it is possible to cover larger working zones with respect to the throughput, mass per unit volume and volume flow.

According to still further features of the present invention the motor and drive of the brush are encapsulated in air-tight manner whereby the apparatus is pressure-tight and aerosols can also be blown out against a counter-pressure. In order to, for example, be able to carry out measurements without serious problems at difficult accessible points, according to a further development of the present invention a detachable and removable operating or control unit is provided. Moreover brush bristles can be made from wire or suitable plastic material.

On filling the solid particles in the form of a heap or bed into the container, there is a bulk or packing density fluctuation in the particles of the solid material due to the batchwise filling of the solid material. This amounts to an aerosol-tight fluctuation in the solid aerosol produced. By virtue of the apparatus according to the invention an adequate constancy is obtained, but it would be desirable to further increase this in certain applications.

To further increase the density fluctuation constancy, according to the present invention, an apparatus is provided for producing a solid aerosol from a heap, with a container for accommodating solids, a feed piston provided with a drive, a rotary brush, an air intake and an outlet, and a light detector arranged in the solid aerosol outlet path, with the detector being connected via a regulating device to the feed piston drive.

As the sensitivity of the light detector measuring means and the regulation in the case of maximum changes occurring for a given aerosol density with maximum intensity absorbed by the photodetector and the intensity is variable as a function of particle sizes and types, according to additional feature of the invention, the light detector includes a light transmitter and a light receiver, which can be pivoted relative to one another about the axis of the solid aerosol jet. In a simple manner the pivotability of light transmitter and light receiver can be achieved in that the light transmitter and receiver are in each case arranged in pipe parts connected in articulated manner to one another. In particular, the pipe parts are interconnected in an articulated manner by ring-like guides leaving free a passage for the solid aerosol.

In a further development of the present invention, it is possible, for further dilution purposes, to arrange an injector in the aerosol jet, with the injector preferably being positioned behind the photoreceiver means, so that the latter still functions with a relatively tight aerosol flow, in that the absolute density fluctuations are higher than in the finally diluted aerosol flow.

Further advantages and features of the invention will become more apparent from the following description when taken in connection with the accompanying drawings.

BRIEF DESCRIPTION OF THE DRAWINGS

FIG. 1 is a diagrammatic section through an apparatus according to the invention along I—I in FIG. 2;

FIG. 3*a* is a plan view of an outlet passage of the present invention;

FIG. 3*b* is a sectional view of the outlet passage of FIG. 32*a;*

FIG. 3*c* is a transverse sectional view of the outlet passage of FIG. 3*b;*

FIG. 4 is a plan view of another outlet passage;

DETAILED DESCRIPTION

Figure 2:
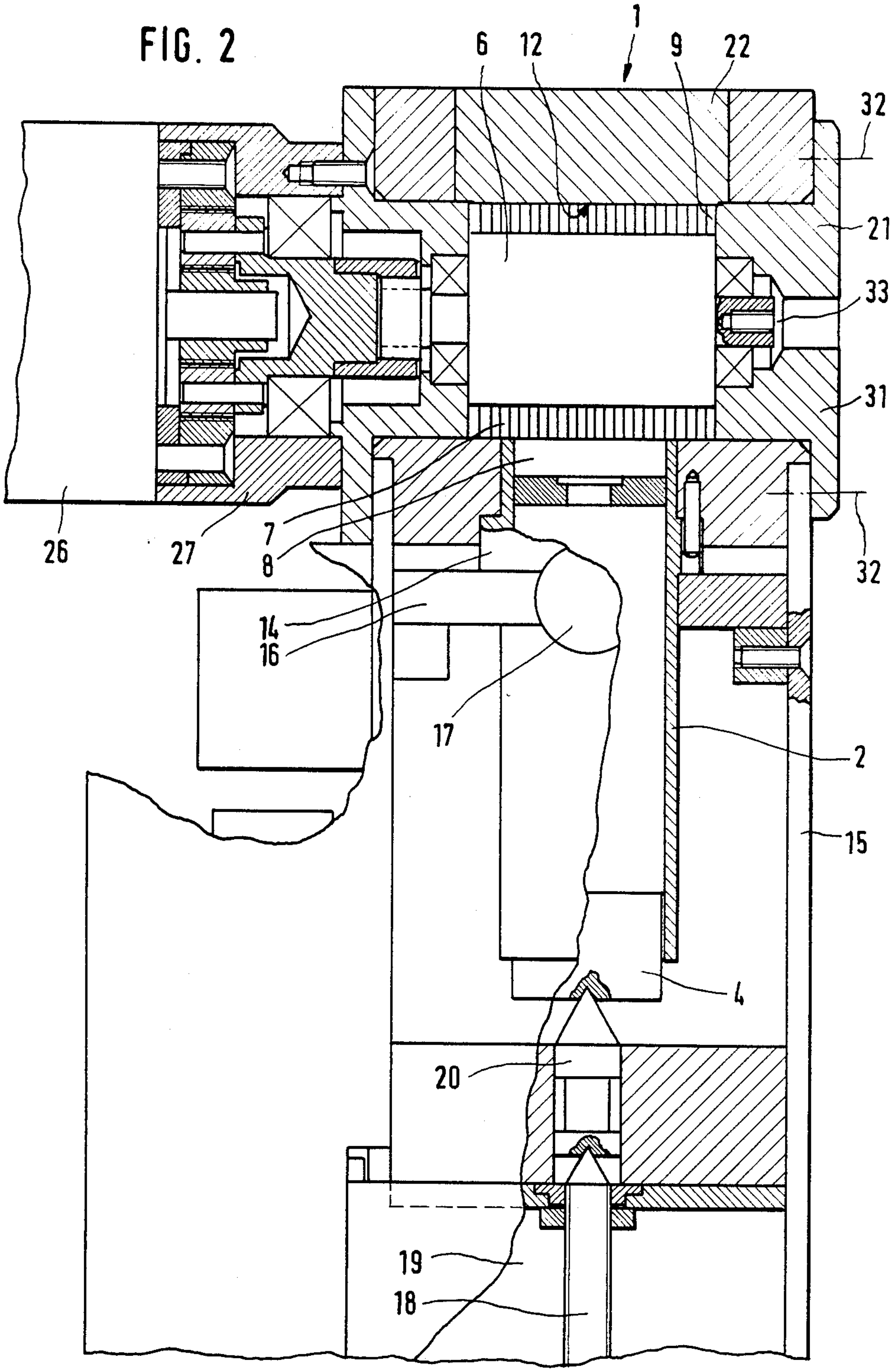
FIG. 2 is a cross-sectional view of a portion of apparatus taken along II—II of FIG. 1.

Referring now to the drawings wherein like reference numerals are used throughout the various views to designate like parts and, more particularly, to FIG. 1, an apparatus generally designated by the reference numeral 1, for producing a solid aerosol from a heap or bed, includes a container 2 accommodating a compacted heap of solid particles 3. The container 2 is cylindrical and has disposed therein an axially movable feed piston 4 for enabling a heap of solid particles 3 to be slowly conveyed in an upward direction. A rotary brush 6 is provided at the upper end of the container 2, with the rotary brush 6 including metal or plastic bristles 7 on a circumference thereof. An air intake 11 and an outlet passage for air flow and solid particles entrained therein is arranged on a used side of the rotary brush 6 at an opening 8 of the container 2.

The feed piston 4 in the container 2 is moved by a feed spindle 18 (FIG. 2) through a spindle guide 19 and, optionally, through an intermediate member 20. The container 2 includes a collar 14 held thereon by a securing plate 16 inserted in the casing 15 and a handle 17, even when there is a pressure build-up in the interior of the apparatus. The above noted features are significant for enabling a constant dispensing because otherwise it may occur that the container slightly drops without the operator noticing it so that suddenly more solid particles 3 are drawn off leading to a dispensing thrust the cause of which would not be immediately apparent. This disadvantage is reliably avoided by the provision of the securing plate 16.

The outlet passage 12 is constructed in a removable part 22 in the form of a cover which is separate from the casing 21 of the rotary brush 6. In its reception region 23 in the vicinity of an apex of the rotary brush 6, the outlet passage 12 has a width x, which at least corresponds to the variable internal diameter of the container 2, because, in operation, the rotary brush 6 is provided with solid particles over a width corresponding to the diameter of the container 2. However, the maximum width x of the outlet passage 12 must not be significantly above this value. The depth z (FIG. 36) in the reception region 23 of the outlet passage 12 is negligible. The aerosol jet formed from air and solids particles passing out of the outlet passage 12 has a cross-section with a substantially identical width and depth and preferably a circular cross-section, so that the measurements are independent of the radial entry direction of a measuring light beam. Preferably, the transition in the case of the outlet passages of FIGS. 3*a,* 3*b,* 3*c* and 4 is such that the outlet passage 12 has a predetermined depth z increasing over a predetermined length y, and predetermined width w, with the outlet passage 12 having a cross-section with the predetermined depth z and predetermined width w, which predetermined width w is non-increasing along the predetermined length y so that a cross-section is non-increasing in an area over the predetermined length y. The boundary walls of the outlet passage 12, both in the intake region 23 and in the outlet region 24 are approximately axially parallel to the air jet direction and the transitions are always of a gentle nature, i.e. there are no edges on the passage walls, thereby avoiding the creation of eddy currents, which could bring about the deposition and/or fluctuating particle quantity flows.

Outlet passage 12 is completely constructed in the separate part or cover 22, so that it can be easily changed and adapted to different requirements, such as different solids container diameters, different air quantity throughputs, etc.

As shown in FIG. 2, the rotary brush 6 is driven by a motor 26, which is completely encapsulated, with the motor 26 including a casing 27 connected in air-tight manner with the brush casing 21. As a result of this construction, the apparatus 1 according to the invention is pressure-tight and can even be operated in the case of counter-pressure at the outlet port 24 of outlet passage 12, which could otherwise lead to an entry of aerosol into the bearings of the rotary brush 6 and the drive.

The rotary brush 6 is mounted and held in a cover plate 31 in the side facing motor 26 and this is fixed solely by two screws 32 to the remaining casing 27 and which e.g. has a thread. A handle (not shown) can be fitted in a recess 33 of the end of the shaft of the rotary brush means of 6 remote from motor 26 and by means of this, following the loosening of screws 32, the rotary brush 6 and cover plate 31 can be easily removed, which greatly facilitates a changing of the rotary brush 6.

By a detachable and removable operating panel (not shown), it is possible to switch on and off the piston feed and return movement, brush movement and air supply, while also regulating the speeds of the rotary brush 6 and the feed. The speed brush roller 6, feed speed and fill level are measured and can be determined from a display. There is also a level indicator which includes, for example, a potentiometer connected to the driving spindle 18, from which a characteristic voltage level for the fill start is taken and is displayed as the fill level height. So as to prevent an advance of the feed piston 4 in the container 2 in the case of a zero or inadequate air supply, an air monitoring means is provided, which only permits the switching on of the piston feed when there is an adequate air flow, which also contributes to dispensing constancy.

For producing a solid aerosol, the container 2 taken from apparatus 1 is carefully packed full with the pulverulent solids, so that a uniform packing density is obtained. The container 2 is inserted and fixed in apparatus 1 in the previously described manner. The air supply, brush rotation and piston feed are then switched on. The bristles 7 of the rotary brush 6 take a certain quantity of solid particles from the surface of the heap of solid particles 3 which is determined by the feed rate of the feed piston 4 and conveys it into a vicinity of the air intake and outlet passage 12. In this region, the solid particles 3 are detached from the rotary brush 6 by the through-flowing air and entrained by outlet passage 12 to its outlet 24 and entrained in an aerosol jet with a high quantity constancy, on which the desired measurements, such as measurements concerning the particle diameter and the like can then be performed.

Figure 5:
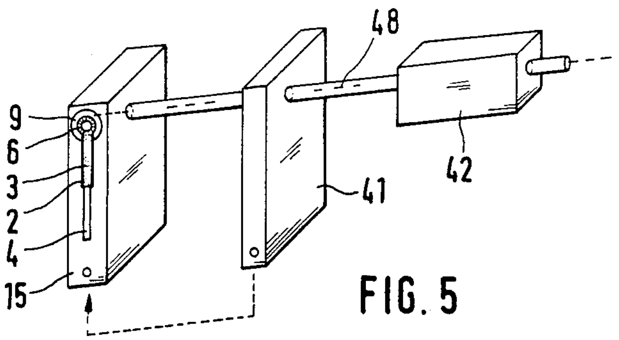
FIG. 5 is a diagrammatic exploded view of the arrangement of the photodetector and injector means.

As shown in FIG. 5, a casing 15 of particle generator 1 is directly followed by a photo-receiver arrangement 41, which includes a regulator for regulating the voltage of the drive f feed piston 4. In the illustrated embodiment, the photoreceiver arrangement 41 is also followed by an injector 42 in which the aerosol jet, produced by the particle generator 1, is further diluted in the aforementioned manner.

Figure 6:
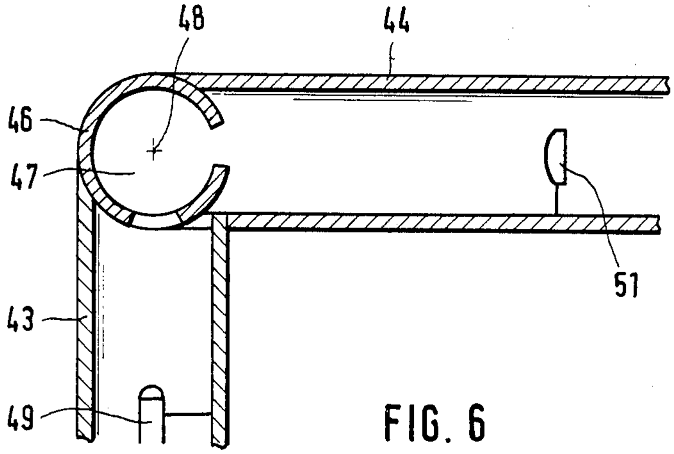
FIG. 6 is a diagrammatic representation of the construction of the photoreceiver arrangement.
Figure 7:
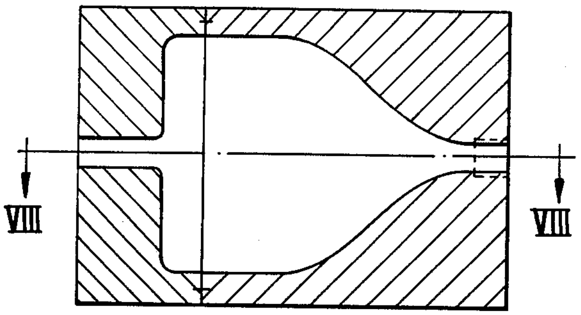
Figure 8:
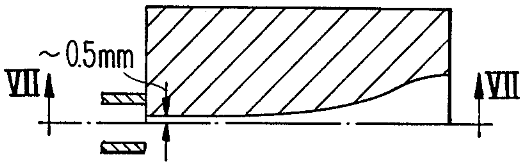

As shown in FIG. 6, photoreceiver arrangement 41 includes two pipe parts 43, 44, which are interconnected in an articulated manner by ring-like guides 46, which surround a passage 47 for the aerosol jet, whose movement direction axis is designated 48. A light transmitter 49 and a photo-receiver 51 is arranged in each of the two pipe parts 43, 44. The relative pivoting position with a relative angle of 90° between the two pipe parts 43, 44 shown in FIG. 6 is not necessary and, in fact, the pipe parts 43, 44 can be pivoted relative to one another about axis 48 in such a way that the stray light of light transmitter 49 occurring on photoreceiver 51 is at a maximum, so that the photo-receiver 51 has an optimum sensitivity.

The light emitted by the light transmitter 49 is scattered on the particles of the solid aerosol jet passing through passage 47, with the maximum intensity of said scattered light being dependent upon the particle size and type. Pipes 43, 44 are pivoted with respect to one another in such a way that the scatter signal received by photo-receiver 51 is at a maximum. The light signal received by photo-receiver 51 fluctuates as a function of the intensity or density of the aerosol passing through the photo-receiver means 41 and specifically in a substantially linear manner, with the actual density of the aerosol being dependent upon the bulk or packing density of the heap of solid particles 3 in the container 2 of particle generator 1. A different bulk or packing density of heap of solid particles 3 results from the fact that individual batches are discontinuously fed into the container 2 and are, in each case, individually compressed or compacted. As a result of intensity fluctuations of the signal supplied by photo-receiver 51, a regulating device is controlled, which speeds up the drive if the light signal from photo receiver 51 is attenuated due to decreasing aerosol density and the covering reduction slows down the drive if the signal of photo-receiver 51 rises due to the greater aerosol density. The regulation or control is sufficiently fast. Compared with an unregulated aerosol jet important advantages are obtained as a result of the photo-optical regulation. The mass flow fluctuations can be kept constant to better than 1% in the case of dry powders and dusts with diameters of <15 um.

As a result of the following injector 42 it is possible to achieve a further dilution of the aerosol produced in generator 1. As a result of cascade arrangements of individual injector elements, it is possible to achieve dilution factors of up to 10,000. As a result of the apparatus according to the invention, for the same final dilution, a much lower compressed air consumption is necessary.

We claim:

1. An apparatus for producing a solid aerosol from a heap or bed, with a container means for accommodating a solid material, a feed piston, a rotary brush, an air intake and an outlet passage having a predetermined length, characterized in that the outlet passage has a predetermined depth, increasing over the predetermined length and a predetermined width, and in that the outlet passage has a cross section with said predetermined depth and said predetermined width, said predetermined width being non-increasing along said predetermined length so that said cross-section is non-increasing in area over said predetermined length.

2. Apparatus according to claim 1, characterized in that the area of the cross-section of the outlet passage decreases over the predetermined length thereof.

3. Apparatus according to claim 1, characterized in that the area of the cross-section of the outlet passage remains constant over the predetermined entire length thereof.

4. Apparatus according to one claims 1, 2 or 3, characterized in that boundary walls of the outlet passage do not have edges.

5. Apparatus according to claim 4, characterized in that the boundary walls define transitions between the depth and width of the outlet passage and are at least rounded.

6. Apparatus according to one of claims 1, 2 or 3, characterized in that the outlet passage is spaced from an opening of the container means to a zone of the rotary brush.

7. Apparatus according to claim 6, characterized in that the outlet passage diametrically faces the opening of the container means to the brush zone.

8. Apparatus according to one of claims 1, 2 or 3, characterized in that the outlet passage is constructed as a removable part separate from a casing of the rotary brush of the apparatus.

9. Apparatus according to claims 1, 2 or 3, characterized in that a motor means and a drive means for the rotary brush are encapsulated in an air-tight manner.

10. Apparatus according to claims 1, 2 or 3, characterized in that a detachable and removable operating unit means are provided for operating the apparatus.

11. Apparatus according to claims 1, 2, or 3, characterized in that a horizontally insertable and fixable securing plate means is provided for holding the container means.

12. Apparatus according to claims 1, 2 or 3, characterized in that a removable lateral cover plate means is provided for supporting the rotary brush.

13. Apparatus according to claim 12, characterized in that a recess means for receiving a handle is formed in a shaft shoulder of the rotary brush for enabling a mounting of the brush roller in the lateral cover plate.

14. Apparatus according to claim 1, characterized in that the feed piston is provided with a drive means, and in that a light detector means is mounted in an outlet path of the solid aerosol, the light detector means is connected to a regulating device to drive the drive means of the feed piston.

15. Apparatus according to claim 14, characterized in that the light detector means includes a light transmitter and a light receiver means, which can be pivoted relative to one another about the axis of a jet of the solid aerosol.

16. Apparatus according to claim 15, characterized in that the light transmitter means and light receiver means are respectively arranged in pipe parts connected to one another in an articulated manner.

17. Apparatus according to claim 16, characterized in that the pipe parts are connected to one another in articulated manner by means of ring-like guides leaving free a passage for the solid aerosol.

18. Apparatus according to one of claims 14, 15, 16 or 17, characterized in that an injector is arranged in the aerosol jet.

* * * * *